April 21, 1931.  F. H. KAMPMAN  1,802,114
AUTO PEDAL LOCKING DEVICE
Filed June 12, 1929   3 Sheets-Sheet 1
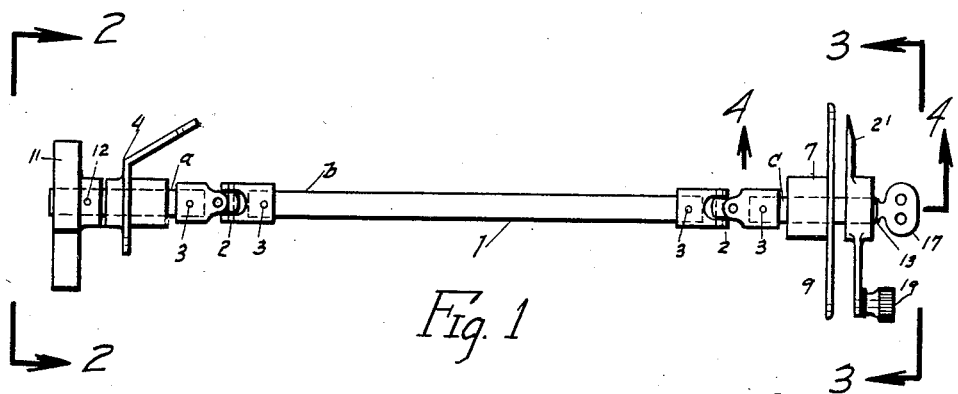
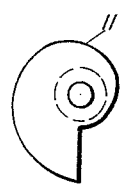
Fig. 2
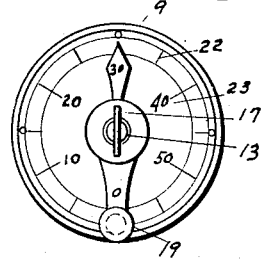
Fig. 3
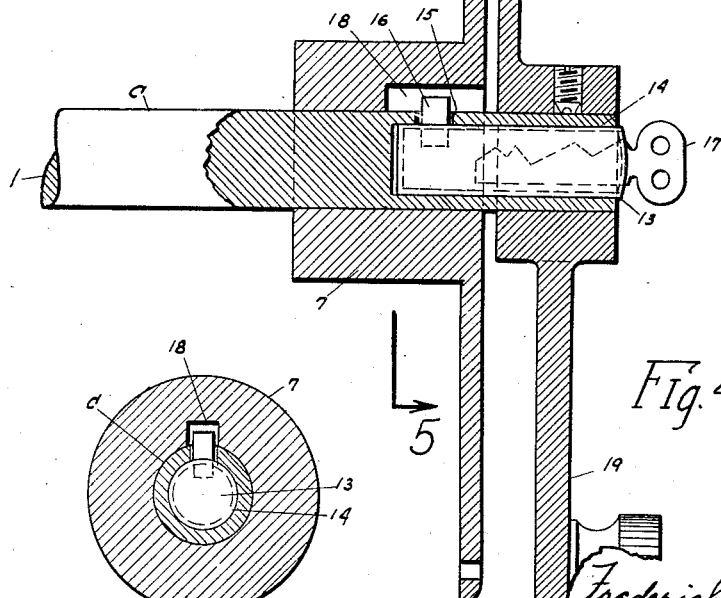
INVENTOR.
Frederick H Kampman
BY Myron J Dikeman
ATTORNEY.

April 21, 1931. F. H. KAMPMAN 1,802,114
AUTO PEDAL LOCKING DEVICE
Filed June 12, 1929 3 Sheets-Sheet 2

INVENTOR.
Frederick H. Kampman
BY
Myron J. Dikeman
ATTORNEY.

Patented Apr. 21, 1931

1,802,114

UNITED STATES PATENT OFFICE

FREDERICK H. KAMPMAN, OF DETROIT, MICHIGAN

AUTO PEDAL-LOCKING DEVICE

Application filed June 12, 1929. Serial No. 370,349.

My invention relates to an automobile pedal locking device.

The object of my invention is to produce a locking device for automobiles, adapted for locking the pedals for preventing further use of the car.

Another object is to provide a special pedal lock adapted for adjustment with the auto accelerator pedal, which will allow the engine to operate at its idling speed only, yet prevent the car from being driven away.

A further object is to produce an automatic locking device that can be operated by either hand or foot means, effective as a locking medium without stopping the engine.

A still further object is to produce a pedal lock that is simple in construction, readily adjusted and installed on any automobile, easily and efficiently operated and can be manufactured at a very low cost.

These several objects are attained in the preferred form by the construction and arrangement of parts more fully hereinafter set forth.

Similar parts on all drawings are marked by similar numerals or letters.

Fig. 1 is a side view of the assembled device showing the relative position of the operating parts.

Fig. 2 is an end view taken on the line 2—2 of Fig. 1 showing the spiral locking cam as mounted on the end of the operating shaft.

Fig. 3 is an end view taken on the line 3—3 of the Fig. 1 showing the operating and locking means as installed therein.

Fig. 4 is an enlarged detail sectional view taken on the line 4—4 of Fig. 1 showing the interior arrangement of the locking unit and means for engaging the bearings.

Fig. 5 is a sectional view taken on the line 5—5 of Fig. 4 showing the locking recesses and means for locking the operating shaft to the bearing.

Figure 6:
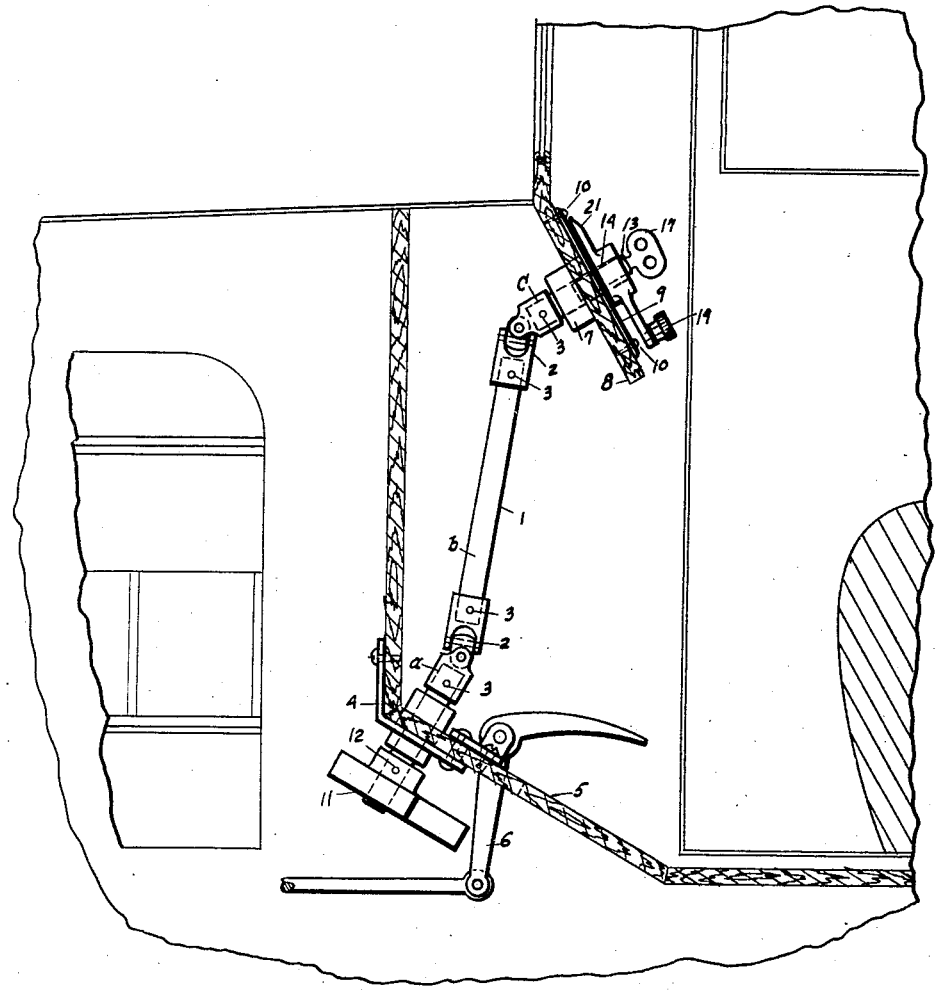
Fig. 6 shows an assembled view of my locking device when installed within an auto body and the relative position to the locked auto pedal to which it may be applied.

I will now describe more fully the detailed construction of my device referring to the drawings and the marks thereon.

This invention is an extension of my former auto pedal regulating device as described in a prior patent application Serial No. 369,470, filed June 8, 1929, for applying the same as a pedal lock when not otherwise in use, and in general comprises a spiral disc cam fixedly attached to one end of a rotatably mounted shaft and provided with an automatic locking device for engaging and locking the shaft and attached cam when turned to a certain position within the supporting bearings. The assembled device being adapted for installation within an auto body, adjacent the operating pedal, preferably the accelerator pedal, with the spiral cam surface in alignment with the pedal movement for engaging and locking the pedal in its released neutral position when the locking cam is rotated to its extreme position. The operating shaft and attached cam may be easily released by a key and the cam rotated away from the pedal, and the device, if applied to an accelerator pedal, may then be used as a speed regulating device as described in my former application above mentioned while the auto is being driven.

The operating shaft —1— is preferably made of jointed sections —a—, —b— and —c—, all connected together by universal joints —2—, although a straight solid shaft may be used in some cases if desired, the universal joints —2— being of any desired type or design suitable for allowing the shaft free rotation when installed, and are fixedly attached to the shaft sections —a—, —b— and —c— by the pins —3—. The shaft section —a— is provided with a suitable floor bearing —4— for fixedly mounting on the foot board —5— of an automobile body, near an auto accelerator pedal —6—, either in front or at one side of the pedal depending upon the type pedal with which it may be used. The bearing —4— is preferably formed for mounting on the under side of the auto foot board and at right angles thereto, although it may be designed and mounted upon the upper side or at various angles with said foot board if desired. The upper shaft section —c— is also provided with a bearing 7, suitable for attaching to an auto instrument board —8— and for rotatably mounting the operating shaft —1— therein. The bearing —8— is preferably formed with a projecting dial flange —9— for fixedly attaching the bearing to the instrument board by means of the screws —10— in the ordinary manner. The shaft section —b— being of sufficient length to connect both rotatably mounted sections —a— and —c— when installed within the foot board and instrument board of an auto, and varies in length with the different type of cars, the whole assembled shaft being capable of rotations within its supporting bearings. At the lower end of the shaft —1— is mounted a spiral disc cam —11—, fixedly attached at right angles thereto by means of the set screw —12—, and is rotatable with said shaft. Both the shaft and attached cam being positioned to provide direct contact between the cam surface and the auto pedal —6— and from the direction of the pedal movement. Within the upper end of the operating shaft —1— is mounted a locking unit —13—, preferably of the automatic, spring type, and of any design desired which is suitable for the purpose, such as the cylindrical plug locking unit commonly used for similar purposes. The shaft —1— is formed with a suitable recess —14—, preferably along the center of the shaft section, of suitable size and shape for receiving and retaining the lock unit —13— therein. The lock unit —13— is securely and fixedly mounted within the recess. The shaft recess —14— is formed with a latch opening —15— at one side near the bottom of the recess, the said recess being of sufficient depth to place the latch recess opening inside of the instrument board bearing —7—. The locking unit —13—, preferably of the cylindrical plug type is designed and provided with a side latch —16—, positioned thereon to engage the latch recess opening —15— at the bottom of the shaft recess —14—, and project the latch —16— outside the shaft walls. The latch —16—, preferably being capable of receding within the locking unit —13— either by pressure on the latch or by operation of the key —17— inserted within the outer end of the lock casing, providing automatic locking means for the shaft in certain positions of the shaft, although the spring type lock may be dispensed with and the straight key lock used if desired, but which would require a key for both locking and unlocking the shaft. The inclosing bearing —7— is formed with an internal latch recess —18— therein, positioned opposite the latch recess —15— of the shaft —1—, and is of sufficient depth to receive the lock latch —16— therein when the operating shaft is rotated to that position. The latch recess —18— being positioned within the bearing —7— to engage the lock latch —16— only when the spiral cam —11— is rotated to its extreme position against the accelerator pedal —6—, for locking and holding the pedal in its released neutral position, preventing any movement thereof. Also mounted on the upper end of the shaft —1— is an operating handle —19—, fixedly attached thereto, providing means for turning the operating shaft —1— and attached cam —11— for either locking or releasing the auto pedal with which it engages, when the lock is released by the key —17—. The operating handle —19— is preferably formed with an indicator arm —21—, radially positioned over the adjacent face of the flange dial —9—, for indicating the relative position of the cam —11— to the pedal —6— at all times. When the cam —11— is not used as a locking device for the pedal, it may then be adapted and used as a speed regulating device for limiting the movement of the auto accelerator pedal as described in my former patent application, Serial No. 369,470, heretofore mentioned. The flange dial —9— is preferably formed with graduations —22— and figures —23—, designed to indicate the speed of auto travel for the different relative positions of the cam —11—, and in a manner as fully described in said former application.

Figure 7:
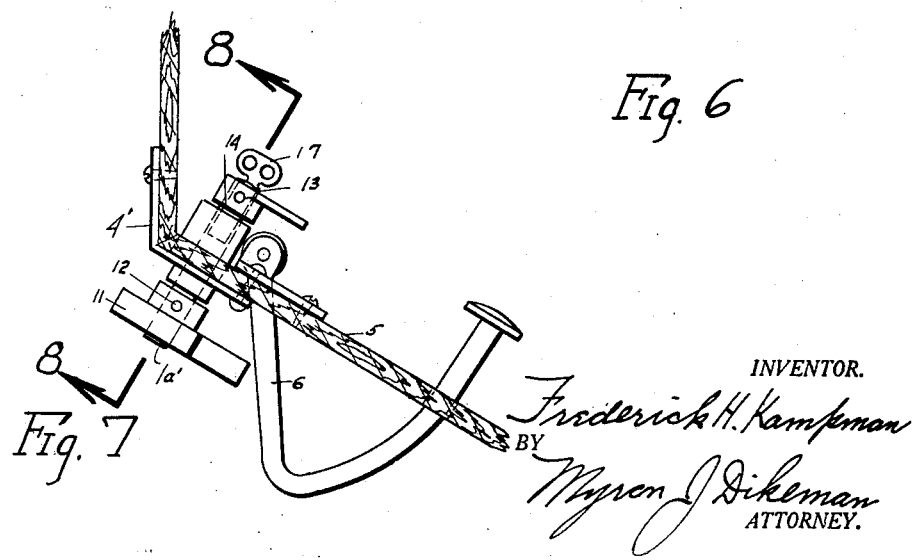
Fig. 7 shows a modified form of my device with the instrument board connections omitted and the locking unit mounted within the foot board bearing.
Figure 8:
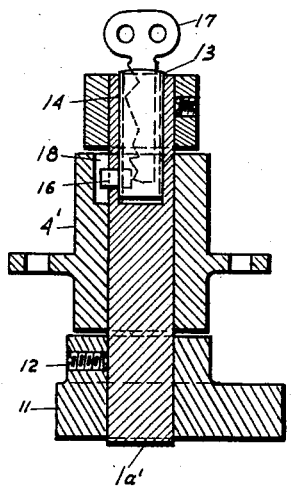
Fig. 8 is a sectional view taken on the line 8—8 of Fig. 7 showing the interior arrangement of the locking unit and the bearing recesses for locking the inclosed shaft.
Figure 9:
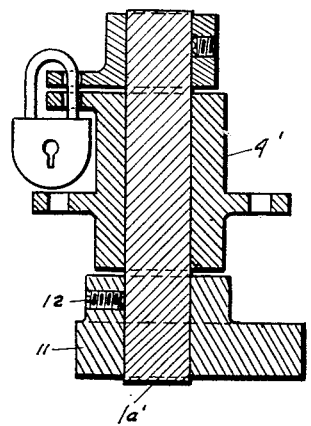
Fig. 9 is a sectional view also taken on the same line 8—8 of Fig. 7 showing an alternate form of locking means for the operating shaft.

Fig. 7 shows a simplified type of my locking device with the instrument board connections omitted, and the locking unit installed within the end of the short shaft —1a'—, of the foot board bearing —4'—, the device is locked and unlocked and operated in the same manner as heretofore described.

Figure 10:
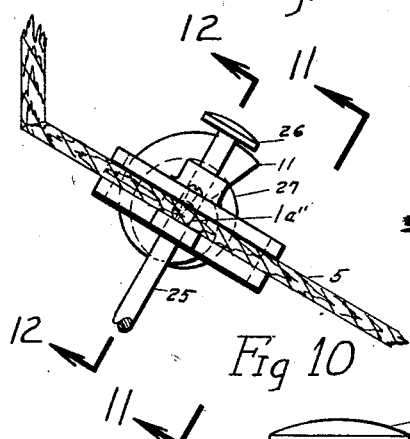
Fig. 10 is a side view of an alternate construction when my device is applied to the pin type of pedal.
Figure 11:
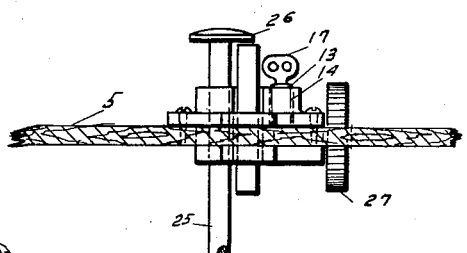
Fig. 11 is a side view of the device shown in Fig. 10, taken on the line 11—11 Fig. 10, showing the arrangement of the operating cam and locking unit.
Figure 12:
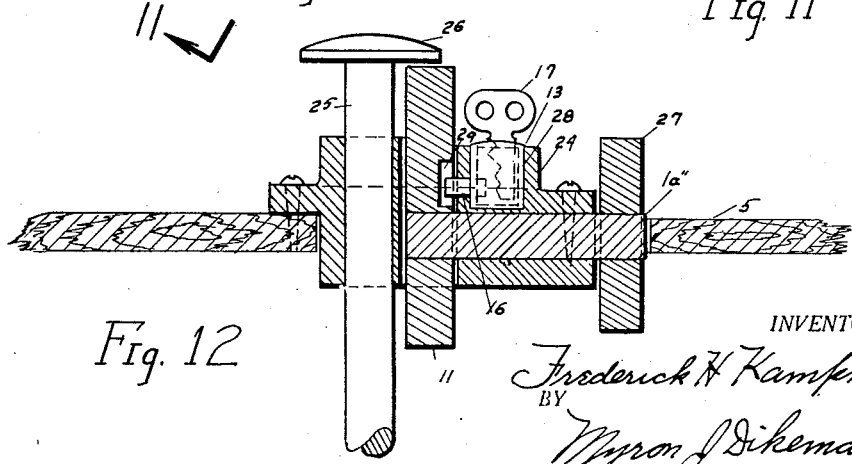
Fig. 12 is an enlarged detail sectional view taken on the line 12—12 of the Fig. 10 showing the interior arrangement of the locking unit and means for attaching and locking the cam.

Figs. 10, 11, and 12 show a modified type of my device when the cam is applied to the pin type of auto accellerator pedal. The floor bearing —24— is preferably designed to inclose the accelerator pin —25— and is extended to one side thereof and carries rotatably mounted therein a horizontal operating shaft section —1a″—, the cam —11— being fixedly attached to the end of the shaft adjacent the accelerator pedal operating pin —25— and positioned directly beneath the head —26—, preventing any movement of the pedal from its neutral position when the cam —11— is rotated on its supporting shaft to its extreme upper position thereunder. A small foot wheel —27—is fixedly attached to the outer end of the said shaft —1a″—, providing means for rotating the shaft and attached cam to any desired position, either for locking or unlocking the said pedal. A cylindrical plug lock —13— is installed within the bearing casing —24—, preferably of the same general type as heretofore referred to and described and illustrated in Fig. 4 of the drawings, and is positioned within a suitable bearing recess —28— so the side latch —16— will engage a cam recess —29— formed on the inner face of the cam —11—, positioned therein for engaging and locking the cam in its high position beneath the pedal pin head —26—. The cam —11— may be released from the lock latch —16— by the key —17— as heretofore described.

While I have shown my locking device in combination with an automobile accelerator pedal, in order to more fully illustrate its use and application as a speed regulating device when not used as a pedal lock, it is apparent that my device may be used to lock any of the auto operating pedals as well, and that my lock is subject to various modifications in both design and application, and I claim any structure which would be substantially a substitution of parts herein shown.

Having fully described my auto pedal locking device, what I claim as my invention and desire to secure by Letters Patent is:

1. A pedal locking device adapted for automobiles and used in combination with one of the auto operating pedals, comprising a disc locking bolt fixedly attached to one end of an operating shaft, suitable support for mounting said operating shaft within an auto body adjacent one of the auto operating pedals, said shaft being free to rotate in the support, means mounted on said operating shaft for causing rotations thereof, and locking means mounted thereon for engaging and locking the shaft and attached locking bolt in some pre-determined position within the support capable of preventing movement of the adjacent auto operating pedal.

2. A locking device adapted for automobiles and used in combination with one of the auto operating pedals, comprising a disc spiral locking bolt fixedly attached to one end of an operating shaft, suitable support for rotatably mounting said shaft and attached locking bolt within an auto body adjacent one of the auto operating pedals, turning means mounted on said operating shaft for rotating same within the support, and locking means mounted within said shaft for fixedly locking same and attached spiral locking bolt in some pre-determined position with the adjacent auto pedal for preventing any pedal movement with engaging said cam.

3. A pedal locking device adapted for automobiles and used in combination with one of the auto operating pedals, comprising a spiral disc locking bolt fixedly attached to one end of an operating shaft, suitable shaft support for rotatably mounting said operating shaft within an automobile body for positioning said spiral locking bolt with the locking bolt surface adjacent one of the auto operating pedals in line with the pedal movement, turning means mounted on said shaft at the one end thereof for rotating same within the support, locking means mounted thereon suitable for engaging and locking said shaft with attached spiral locking bolt in some pre-determined position with the adjacent auto operating pedal for preventing any pedal movement.

4. A pedal locking device adapted for automobiles and used in combination with one of the auto operating pedals, comprising a disc spiral locking bolt fixedly attached to one end of an operating shaft, suitable support for rotatably mounting said shaft within an automobile body for positioning said spiral locking bolt surface adjacent one of the auto operating pedals and in line with the movement thereof, capable of engaging and preventing pedal movement for one position of said locking bolt, turning means mounted on one end of said operating shaft for rotating said locking bolt in and out of its locking position, and a suitable lock mounted thereon for engaging and locking said shaft and attached locking bolt in its pedal locking position for preventing movement of the auto operating pedal.

In witness whereof I sign this specification.

FREDERICK H. KAMPMAN.